(12) United States Patent
Robinson

(10) Patent No.: US 12,079,888 B2
(45) Date of Patent: Sep. 3, 2024

(54) REAL-TIME DATA STREAM FOR CARBON EMISSION AGGREGATION

(71) Applicant: Jessica Jane Robinson, Grass Valley, CA (US)

(72) Inventor: Jessica Jane Robinson, Grass Valley, CA (US)

(\*) Notice: Subject to any disclaimer, the term of this patent is extended or adjusted under 35 U.S.C. 154(b) by 0 days.

(21) Appl. No.: 17/341,845

(22) Filed: Jun. 8, 2021

(65) Prior Publication Data

US 2021/0383486 A1 Dec. 9, 2021

Related U.S. Application Data

(60) Provisional application No. 63/036,985, filed on Jun. 9, 2020.

(51) Int. Cl.
| | |
|---|---|
| *G06Q 50/06* | (2012.01) |
| *G06F 11/34* | (2006.01) |
| *G06F 21/31* | (2013.01) |
| *G06Q 30/0207* | (2023.01) |

(52) U.S. Cl.
CPC ......... *G06Q 50/06* (2013.01); *G06F 11/3438* (2013.01); *G06F 21/316* (2013.01); *G06Q 30/0207* (2013.01)

(58) Field of Classification Search
CPC .......... G06Q 50/06; G06Q 30/02–0277; G06F 21/316
See application file for complete search history.

(56) References Cited

U.S. PATENT DOCUMENTS

| 2016/0077538 A1* | 3/2016 | Berka | ................... H02J 3/00 700/291 |
| 2020/0126108 A1* | 4/2020 | Khan | ................... H04L 67/535 |

FOREIGN PATENT DOCUMENTS

WO WO-2012119245 A1 * 9/2012 ....... G06F 17/30867

OTHER PUBLICATIONS

Goldenberg, S., "Half of all US food produce is thrown away, new research suggests," The Guardian, Jul. 13, 2016, 11 pages, [Online] [Retrieved on Jul. 16, 2021], Retrieved from the Internet <URL: https://www.theguardian.com/environment/2016/jul/13/as-food-waste-ugly-fruit-vegetable-perfect?CMP=share_btn tw>.

(Continued)

*Primary Examiner* — Raquel Alvarez
(74) *Attorney, Agent, or Firm* — Fenwick & West LLP

(57) ABSTRACT

The enclosed is a description of a computer-implemented method for aggregation of carbon emission data. A server receives data entries recording user actions from an application of a client device. The server assigns each data entry to one or more communities of the application. The user actions recorded are converted by the server to carbon emission equivalents. The carbon emission equivalents of a community to which a particular user belongs are aggregated for the particular user. The server establishes a data stream with the client device of the particular user and transmits the carbon emission equivalents of the community and a totality of carbon emission equivalents of the application to the client device. The carbon emission equivalents of the community and the totality of carbon emission equivalents, including communities the user is excluded from, are displayed on the client device on a master dashboard of the application.

19 Claims, 12 Drawing Sheets

(56) References Cited

OTHER PUBLICATIONS

ICF International, "Documentation for Greenhouse Gas Emission and Energy Factors Used in the Waste Reduction Model (WARM). *Containers, Packaging, and Non-Durable Good Materials Chapters*," U.S. Environmental Protection Agency, Office of Resource Conservation and Recovery, Feb. 2016, 82 pages.

Resilience Birthright, "Earth Warrior Carbon Calculator," 2019, three pages, [Online] [Retrieved on Jul. 16, 2021], Retrieved from the Internet <URL: https://www.resiliencebirthright.org/>.

Stopwaste Partnership GHG, "Greenhouse Gas Reductions Calculator," undated, one page, [Online] [Retrieved on Jul. 16, 2021], Retrieved from the Internet <URL: http://www.stopwaste.co/calculator/>.

United States Environmental Protection Agency, "Greenhouse Gas Equivalencies Calculator," Mar. 2021, one page, [Online] [Retrieved on Jul. 16, 2021], Retrieved from the Internet <URL: https://www.epa.gov/energy/greenhouse-gas-equivalencies-calculator>.

\* cited by examiner

800

805

Carbon Calculator create an action

Choose For
- ● For Self
- ○ For Sub Account

Location ⓘ
- ○ Community
- ○ Public Place

- ○ Calculation goes directly to litter
- ○ Calculation goes directly to carbon metric tons
- ○ Calculation goes directly to sustainable action
- ● Calculation goes directly to meals recovered
- ○ Calculation goes directly to sustainable miles
- ○ Calculation goes directly to hours

[ Select Action ▼ ]

[ ---Select --- ▼ ]

[ ---Select --- ▼ ]

[ Submit ]

810

| Select Action | | |
|---|---|---|
| Select Action | | |
| Life Below Water and on Land | ○ | ○ |
| Refusing Meat, Dairy and Eggs | ○ | ○ |
| Responsible Consumption and Production | ○ | ○ |
| Special Action for Schools | ● | ○ |
| Sustainable Living | | ○ |
| Transportation | ○ | ○ |

FIG. 8

REAL-TIME DATA STREAM FOR CARBON EMISSION AGGREGATION

CROSS REFERENCE TO RELATED APPLICATIONS

This application claims the benefit of the U.S. Provisional Patent Application No. 63/036,985 filed on Jun. 9, 2020.

TECHNICAL FIELD

The disclosed embodiments generally relate to a computing platform for aggregating data in real time, and particularly to a real time data stream for aggregating carbon footprint related data.

BACKGROUND

Presenting data effectively in a computing system can be challenging when the information may not be easily quantifiable. In modern computing systems, an enormous amount of data obtained from various sources is processed by a computing system. To provide a more comprehensible aspect of data, statistics and aggregation are often used to provide a summary of the data and the underlying events. However, when unstructured data are generated from various sources that do not necessarily agree with each other on the data format and structure, aggregation of the data is often difficult due to the discrepancies in data forms. The issue is particularly problematic in tracking carbon footprint and emission of users because relevant activities were conventionally difficult to quantify. As such, aggregation of data is challenging, especially for data from various sources that represent a group of users or a community.

SUMMARY

The enclosed is a computer-implemented method of aggregating user actions and converting those user actions into carbon emission equivalents. A carbon emission equivalent for an action or set of actions is the amount of carbon emissions that are avoided through sustainable action. For example, the user action of biking to work has the carbon emission equivalent of taking a gas-powered vehicle the same distance and represents the amount of carbon prevented from entering the atmosphere by choosing the more sustainable action (i.e. biking rather than driving). The method includes receiving from an application on a client device (a smart phone, laptop, desktop computer, etc.) data entries that record user actions. Each of the data entries is assigned to one or more communities. In the example of biking to work, the user action is assigned to the user's neighborhood, household, or place of work. The user actions recorded in the data entries are converted to carbon emission equivalents. The carbon emission equivalents are aggregated for the community that the particular user belongs to. A data stream is established over which the carbon emission equivalents of the community to which the user action is assigned are transmitted. The totality of carbon emission equivalents in the method are additionally aggregated and displayed on a master dashboard of a client device. The master dashboard includes user actions of communities.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 8 is a diagram illustrating an embodiment of a user interface for recording a user action and selecting action parameters, in accordance with some embodiments.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
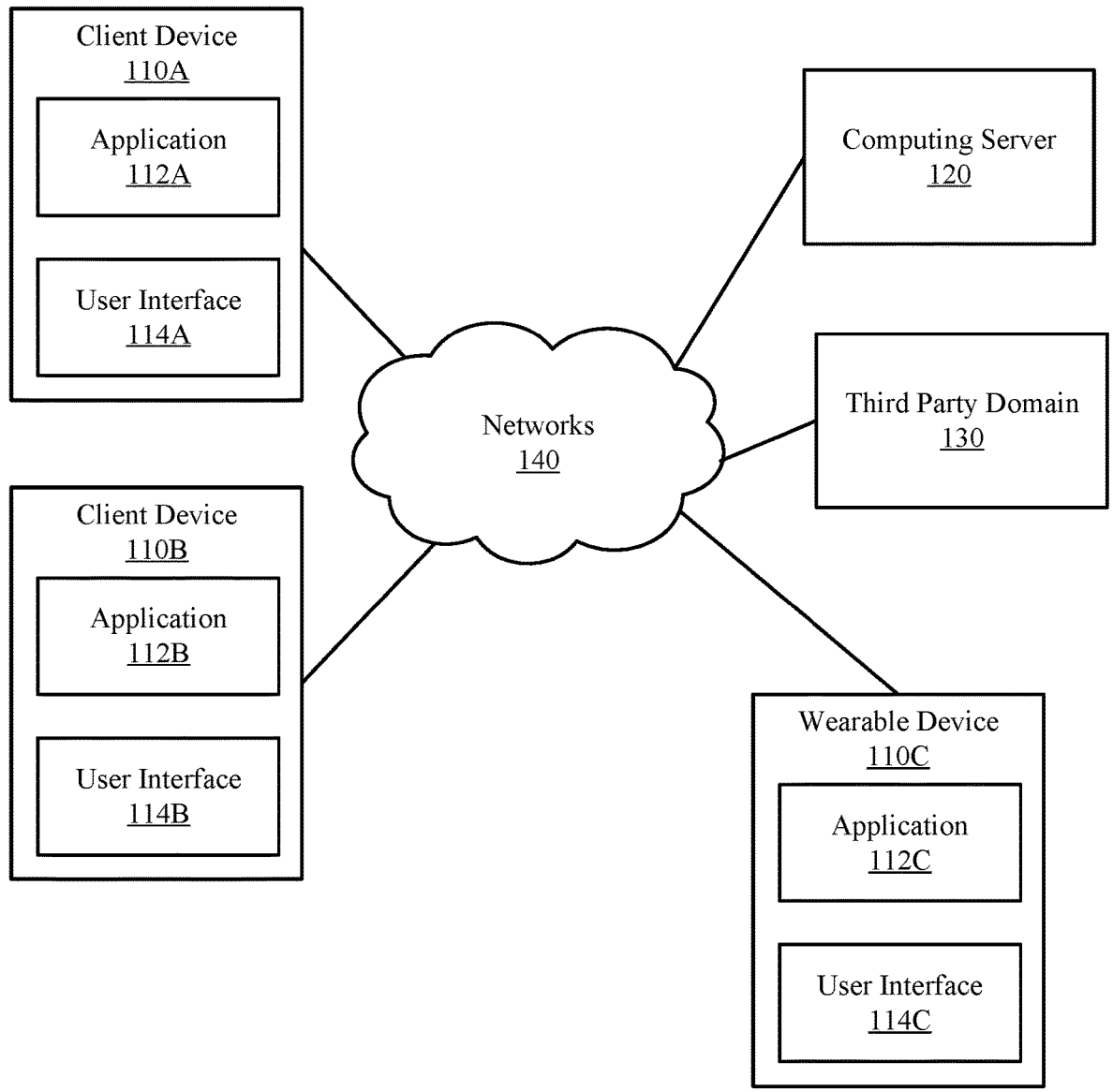
FIG. 1 is block diagram illustrating an example system environment, in accordance with some embodiments

FIG. 1 is a block diagram illustrating an example system environment, in accordance with some embodiments. In some embodiments, the system 100 may include one or more client devices, such as 110A, 110B, 110C, etc. (collectively referred to as client devices 110 or a client device 110), a computing server 120, a third party domain 130, and networks 140. A client device 110 may take the form of a computing device, such as a personal computer, a smartphone, a wearable device 110C (e.g., smartwatch or fitness band), etc. In various embodiments, the system 100 includes fewer and additional components that are not shown in FIG. 1. The components in the system 100 may communicate through the network 140.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in some embodiments, while the client device 110 is sometimes described in a singular form, the computing server 120 may be a service provider that serves multiple client devices 110 simultaneously. Conversely, a component described in the plural form does not necessarily imply that more than one copy of the component is always needed in the environment 100.

A client device 110 may be controlled by a client of the server 120 who inputs various information such as actions, profiles, communities etc. The client device 110 may be referred to as a user device or an end user device. Each client device 110 may include one or more applications 112 (individually referred to as 112A, 112B, 112C, etc., and collectively referred to as applications 112 or an application 112) and one or more user interfaces 114 (individually referred to as 114A, 114B, 114C, etc., and collectively referred to as user interfaces 114 or a user interface 114). The client devices 110 may be any computing device. Examples of such client devices 110 include personal computers (PC), desktop computers, laptop computers, tablets (e.g., iPads), smartphones, wearable electronic devices such as smartwatches, or any other suitable electronic devices.

A wearable device 110C may provide data that enhances user experience. Devices such as smartwatches allow real time detection of sustainable transportation such as walking, biking, or taking public transit. Applications of a wearable device 110C may include providing novel visual feedback on wearable displays, tracking an amount of time spent commuting or performing an action such as picking up trash, tracking steps taken or distance travelled, and supplying a user interface for inputting user actions to the application. The information recorded by the wearable device 110C may be communicated to the server 120 which makes the information visible on the client device 110.

The application 112 may be a social media platform that enables tracking of individual and community carbon emissions as well as the actions that prevent carbon emissions. The application 112 operates on the client devices 110. The application 112 may be designed to help users to understand their impact on the environment specifically through measuring their carbon emissions and connect them with resources, activities, and communities to make more sustainable choices. An application 112 may be in communication with the computing server 120 via the network 140. The application 112 may receive various inputs from the users related to user actions, accounts with user personal information, and communities with specified goals and access parameters. The application 112 may provide outputs including carbon emission equivalents, widgets, advertisements, a master dashboard, incentives and rewards, and a community map. The relationship between user inputs and application outputs is further described in FIG. 3.

In various embodiments and depending on the type of client device 110, the application 112 may take different forms. In one embodiment, the application 112 is a web application or a mobile application. In one embodiment, an application 112 is a web application that runs on JavaScript or other alternatives, such as TypeScript, etc. In the case of a web application, the application 112 may cooperate with a web browser, which is an example of user interface 114, to render the visual elements and interactive fields of the application 112. In another case, an application 112 is a mobile application. For example, the mobile application runs on Swift for iOS and other APPLE operating systems or on Java or another suitable language for ANDROID systems. In yet another case, an application 112 is a software program that operates on a desktop operating system such as LINUX, MICROSOFT WINDOWS, MAC OS, or CHROME OS.

In one embodiment, the computing server 120 manages and provides the application 112. For example, the company operating the computing server 120 may be a cloud service provider that provides a front-end software application that can be installed, run, or displayed at a client device 110. For example, the company provides the applications 112 as a form of software as a service (SaaS). In one case, an example application 112 is published and made available by the company operating the computing server 120 at an application store (e.g. App store) of a mobile operating system.

The user interfaces 114 may be any suitable interfaces for receiving inputs from users and for communication with users. The user interfaces 114 may take different forms. In one embodiment, the user interface 114 is a web browser such as CHROME, FIREFOX, SAFARI, INTERNET EXPLORER, EDGE, etc. and the application 112 is a web application that is run by the web browser. In another application, the user interface 114 is part of the application 112. For example, the user interface 114 is the front-end component of a mobile application or a desktop application. The user interface 114 also may be referred to as a graphical user interface (GUI) which includes graphical elements to display various elements of the application 112. In another embodiment, the user interface 114 may not include graphical elements but communicates with the computing server 120 via other suitable ways such as application program interfaces (APIs).

The computing server 120 is one or more computing devices that process inputs from users and generate various results. In this disclosure, the computing servers 120 may collectively and singularly be referred to as a computing server 120, even though the computing server 120 may include more than one computing device. For example, the computing server 120 is a pool of computing devices located at the same geographical location (e.g., a server room) or distributed geographically (e.g., cloud computing, distributed computing, or in a virtual server network). In some embodiments, the entity operating the computing server 120 may be the publisher of the application 112, which communicates with the computing server 120 to download various data generated by the computing server 120.

Figure 10:
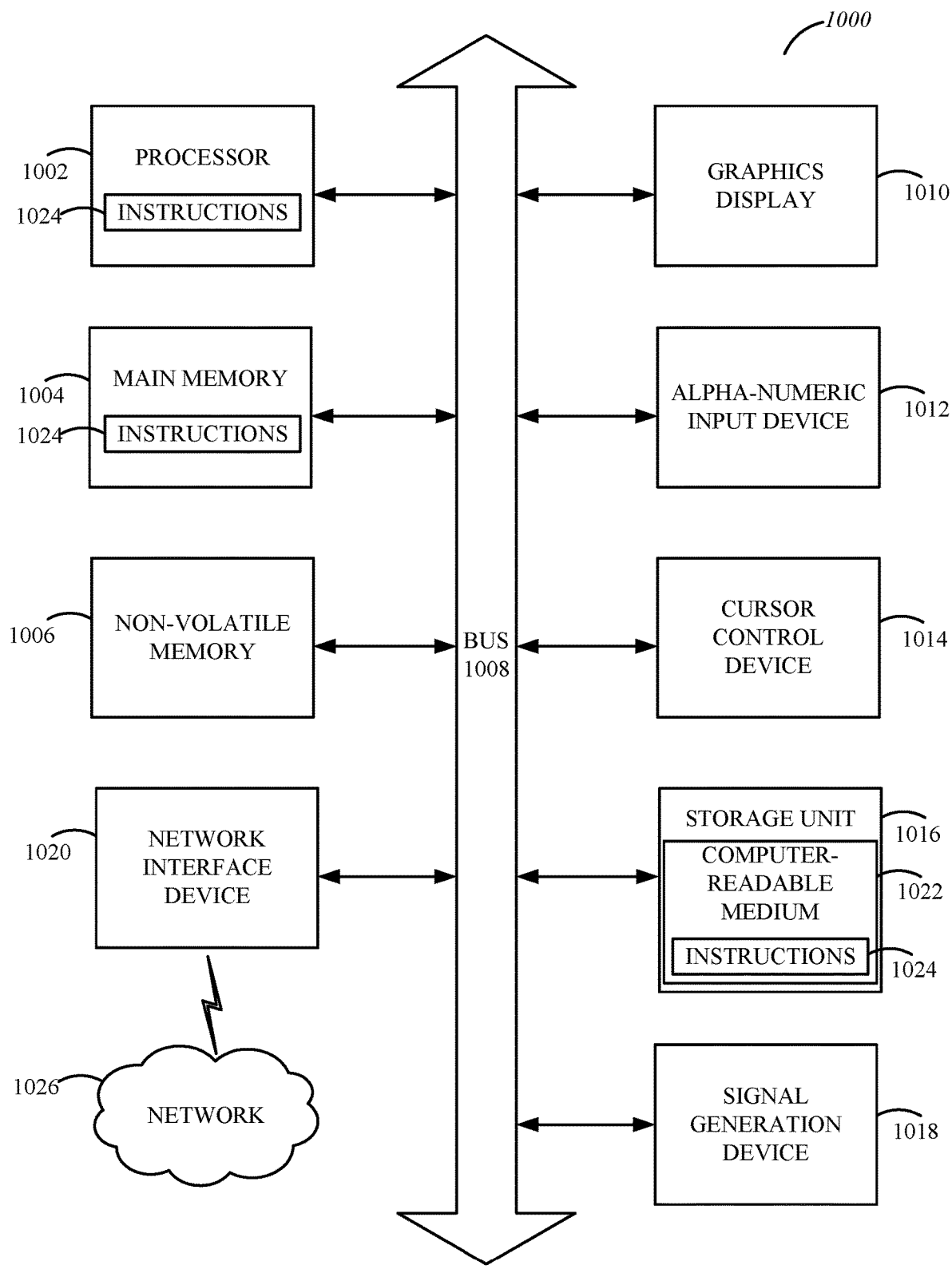
FIG. 10 is a block diagram illustrating an example architecture of a computing device, in accordance with some embodiments.

A computing device of the computing server 120 takes the form of software, hardware, or a combination thereof (e.g., a computing machine of FIG. 10). For example, parts of the computing server 120 may be a PC, a tablet PC, a smartphone, an internet of things (IoT) appliance, or any machine capable of executing instructions that specify actions to be taken by that machine. Parts of the server 120 may include one or more processing units (e.g., a central processing unit (CPU), a graphics processing unit (GPU), a digital signal processor (DSP), a controller, a state machine, one or more ASICs, one or more RFICs, or any combination of these) and a memory.

A third party domain 130 may be a website, social media page, or application separate from application 112. The third party domain 130 may belong to an organization that participates in one or more carbon footprint tracking activities and uses the application 112 to track the activities of its participants. The third party domain 130 may receive information from the server 120. A third party domain 130 can display information aggregated by the server 120, which receives data from various participants who enter their activity information through the applications 112. For example, third party domain 130 associated with a particular community may display a widget containing aggregated community data including carbon emission equivalents. The widget may be an applet that can be embedded in the website of the third party domain 130 and can establish a data stream with the server 120 to receive updates of the carbon footprints of the participants.

The communications between the client devices 110 and the server 120 may be transmitted via a network 140, for example, via the Internet. The network 140 may provide connections to the components of the system 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 may also include links and packet switching networks such as the Internet.

Figure 2:
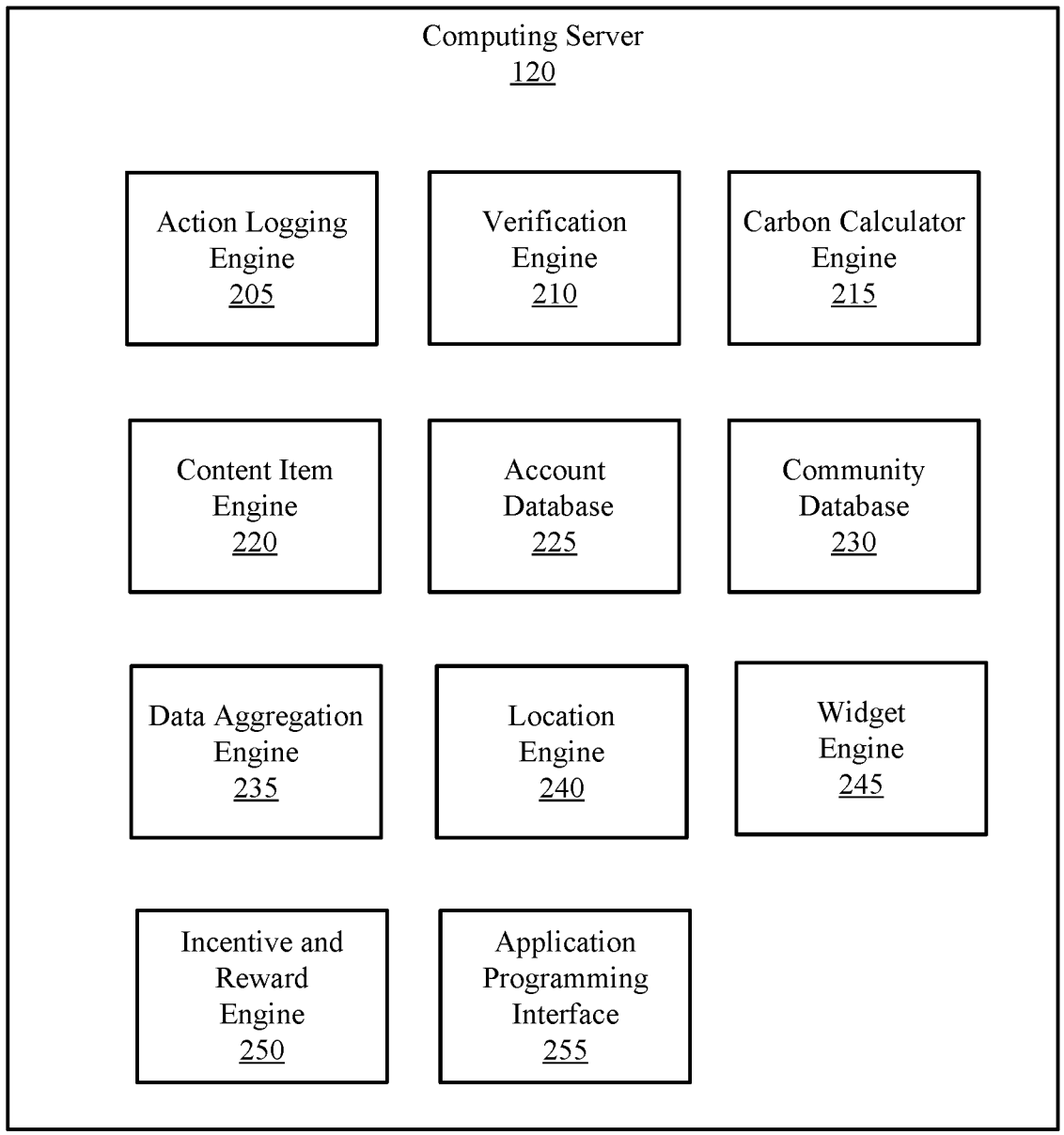
FIG. 2 is a block diagram illustrating the architecture of an example computing server, in accordance with some embodiments.

FIG. 2 is a block diagram illustrating the architecture of an example computing server, in accordance with some embodiments. In some embodiments the server 120 may provide and manage to application 112. The server 112 includes the following computing engines: action logging engine 205, verification engine 210, carbon calculator engine 215, content item engine 220, account database 225, community database 230, data aggregation engine 235, location engine 240, widget engine 245, incentive and reward engine 250, and application programming interface 255. The above engines are described below to exemplify functionality of the server 120. Some embodiments may include additional engines not described here that would be obvious to one skilled in the art.

The example computing server 120 shown may include one or more computers such as one or more server-side computing devices and cloud computing devices. The server-side computing device and the cloud computing devices each may include one or more processors and memory. The memory may store computer code that includes instructions. The instructions, when executed by one or more processors, cause the processors to perform one or more processes described herein, such as one or more processes or workflows defined by instructions. In some embodiments, the server-side computing device and the cloud computing devices may be implemented in a distributed manner. For example, the server-side computing device may communicate with the cloud computing devices via the network 140. The cloud computing devices may include multiple computers operated in a distributed fashion. The computing server 120 may also take other forms. For example, instead of implementing cloud computing devices, the computing server 120 may take the form of a non-cloud server. The computing devices may be one of the on-site servers that communicate with the server-side computing device locally. In some embodiments, the computing server 120 may take the form of a personal computer that executes code instructions directly instead of using any additional computing devices. Other suitable implementations are also possible.

The components of the computing server 120 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 10. Various engines and databases in FIG. 2 may individually or cooperatively serve as the computational backend of the computing server 120. In some embodiments, the computational backend can be embodied as computer instructions that are stored in memory. The instructions, when executed by one or more processors, cause the one or more processors to perform the features and functionalities of one or more engines described below. While the functionality of the computational backend may be divided as various engines shown in FIG. 2, the functions of various components in computing server 120 may be distributed in a different manner than described below.

Action logging engine 205 provides an interface for users to log their actions in the application 112. The interface displayed to users for entering actions is further described is FIG. 8. The action logging engine 205 takes in user inputs such as an action type (recycling, sustainable transportation, meal recovery, etc.) action volume, user account or sub-account, and community or sub-community. Action logging engine 205 may take the user input action type and, based on instructions native to the engine 205, note what impact category the action is assigned to. For example, a user may input the action type "transportation," and the engine 205 native instructions indicate that "transportation" actions are assigned to the "sustainable miles" impact category. The action logging engine 205 may create a data packet that includes account information, community, action type, and impact category for transmitting to other engines in the server 120.

Action logging engine 205 registers actions including the various action types. Non-exhaustive examples of potential activities that may be logged by the action logging engine 205 include the following: Picking up litter to prevent waste materials from polluting land and waterways, in which a user may record a volume or time spent picking up litter in a specific location or for a specific community. Composting to prevent excess methane emitted by landfills, in which a user may record a volume of food scraps or other organic materials composted in their backyard or left on their curb for community pick up. E-waste recycling to ensure the proper disposal or recycling of precious metals that are otherwise unrecyclable, in which a user may record the type of materials recycled and the volume. Purchasing eco-friendly products or supporting eco-friendly businesses, in which a user may record the product they purchased or list a donation as a carbon offset. Recycling of glass bottles, metal cans, paper, and plastic bottles to ensure proper recycling techniques, in which a user may record volume and material recycled. Refusing single-use disposables like plastic bags, plates, cups, and straws to prevent these items from entering landfills, in which the user can record a type or material of product refused as well as a volume. Reusing bags, napkins, plates etc. to prevent waste and material weakening through recycling, in which the user can record a type of material or object used as well as a volume. Upcycling clothing, furniture, or other items that would otherwise end up in a landfill, in which the user can record the material or volume of the objects upcycled. Food sharing to prevent unnecessary food waste, in which schools that serve meals record a volume of unopened food that can be shared with other communities in need and users can record type and volume of foods shared. Planting native plants to prevent invasive species and ensure soil health, in which a user can record time spent plant, number or type of plants planted. Sustainable gardening to prevent pollution with harmful fertilizers and provide for beneficial insects such as bees, in which a user can record products they have avoided or more sustainable versions they have instead used. Sustainable transportation to decrease dependency on fossil fuels and emissions caused by them, in which a user may record a transportation type (such as biking, public transport, electric vehicle, walking, etc.) and duration in time or distance. The action types listed here may not be an exhaustive list of possible recordable actions and the parameters listed with each action may not describe all possible parameters. Other action types may exist and be recorded with a variety of parameters.

Verification engine 210 works alongside the action logging engine 205 to provide a method of verification of the action input by the user. When the user inputs an action, the verification engine 210 provides an additional field for the user to upload or otherwise provide verifying information. Verifying information may include a photo of the user doing the action, a user signature on an honor statement, or location information for location-based actions such as particular events or sustainable transportation. The verification information is then approved or denied based on additional input. Additional input may come in the form of a system administrator viewing an uploaded image of a user action and confirming the validity of the image as a piece of verification information. Modules of the verification engine 210 may also supply the additional input such as by using image processing to identify a signature on an honor statement. Other embodiments of verification are possible and depend on the type of information supplied. If the verification information is approved, the verification engine 210 may notify the user via embodiments such as a push notification or email or a virtual badge.

Carbon calculator engine 215 may receive information from the action logging engine 205 including the action type, volume, and impact category and convert the action information into a carbon emission equivalent. A carbon emission equivalent relates to the carbon footprint of an object or action. The carbon emission equivalent is a measure of how much carbon in the form of carbon dioxide is prevented from entering the atmosphere as a result of an action. Carbon calculator engine 215 may base its calculations on information stored in a native database. The engine's database may include ratios and algorithms for calculating the carbon emission equivalent of an action. For example, if a user inputs that they refused use of 5 single use plastic straws, the carbon calculator engine 215 will search the engine database for single use plastic straws and multiply the cradle to grave carbon emission associated with a plastic straw by 5, to get the overall carbon emission equivalent of the action. The conversions may not be simple ratios, though. In some embodiments, carbon emission equivalents may include location or time based parameters in an equation. For example, if the user recycled plastic in a particular city that is known to recycle their plastic at a facility far from the city, incurring transportation emissions, the carbon calculator engine 215 may take that information into account and subtract the transportation emission of the recycled plastic from the carbon emission equivalent value. The carbon calculator engine 215 also calculates the impact of actions in ways other than carbon emissions. The engine 215 may also convert actions into measurements such as meals recovered, sustainable miles, or hours.

In an example calculation by the carbon calculator engine 215 related to a user recycling a plastic bottle, the engine 215 begins by accessing a database of carbon footprints of specific objects and navigating to the entry for plastic bottles. The database includes entries for the approximate weights of an item. An example average weight of a plastic bottle is 15 grams. The database additionally includes entries for the impact of recycling a metric ton of plastic which, in this example, may be −1 metric tons of carbon dioxide equivalent per ton of plastic recycled (MTCO2e/ton). The weight of the plastic bottle is then converted from grams to tons and multiplied by −1 MTCO2e/ton to receive the carbon emission equivalent of recycling one plastic bottle. This value is negative because it represents an amount of greenhouse gas that is sequestered from the atmosphere or prevented from entering the atmosphere.

Content item engine 220 draws information from the community database 230 to display content items to users on the application. Content item engine 230 recommends content items (communities, events, sustainable businesses etc.) to users based on their account information from the account database 235 (location, biographic information, etc.). For example, the content item engine 220 may collect account location data of the user's device and community location data then display communities within a threshold distance of the user's device. Content item engine 230 may also recommend content based on user activity. For example, if a user is part of a recycling-focused community or records many recycling actions, the content item engine 230 recommends recycling-focused events, businesses, and groups to the user. The content item engine 220 may also recommend and display content to users based on other parameters.

Content items recommended by the content item engine 220 may include sponsored content items. Sponsored content items may be content that a person or business pays to have displayed on the application, such as advertisements. Sponsored content items may include metadata tags describing their intended audience or other preferences. The content item engine 220 decides which sponsored content item to display to a user based on the relation of the metadata tags to the user. For example, if a sponsored content item has a "recycling" metadata tag, it will likely be shown to a user who has recorded recycling actions or is part of recycling-related communities. Sponsored content items may also be chosen based on the application lifecycle of a particular user. Application lifecycle events are events that are related the usage of an application, such as first use, opening the application, closing the application, taking an action in the application, allowing background activities of the application, etc. For example, application lifecycle includes how often the user uses the app and for how long they use it. Application lifecycle may also include location data of a user. Sponsored content items may be chosen to be shown to users who spend a lot of time on the application or open it frequently since they would be the most likely to interact with the sponsored content item. Sponsored content items may also be chosen based on the location of the user being within a threshold distance of location metadata of a sponsored content item (i.e. within a threshold distance of a business that has sponsored the content item). Once a sponsored content item is chosen, based on its metadata, for a user, it is displayed on the user's client device in the application.

Account database 225 stores data associated with user accounts and sub-accounts. Each user account may host multiple sub-accounts for other users. For example, a parent may host multiple sub-accounts for their children on their primary account. Data associated with the sub-accounts is stored in the database entry related to the primary account. Data associated with accounts and sub-accounts may include user biographical information, location data, user action data, and communities the user account is part of.

Community database 230 stores data associated with communities and sub-communities. Each community may host multiple sub-communities. For example, an elementary school may be a community and host a sub-community for each class within the school. Data associated with sub-communities is stored in the database entry associated with the primary community. Community data may include actions users assign to the community, community categories, community names and locations, community descriptions, community resources, and accounts associated with the community. The community database 230 may also store a community page associated with each community, the community page hosting a description of the community, number of members, and actions attributed to the community. Actions recorded by users may be stored in both account database 225 and community database 230. Actions entered by a user of a particular account are stored in the account database 225 while actions assigned to a particular community are stored in the community database 230. Data for a particular action may be stored in one or both databases 225 and 230.

Data aggregation engine 235 aggregates data stored in the account and community databases 225 and 230 based on specified parameters. The data aggregation engine 235 may, for example, sum the action volumes of actions recorded by a specific user account to find a total volume of the user account's actions. That total volume may then be input to the carbon calculator engine 215 to be converted to the user's total carbon emission equivalent. The data aggregation engine 235 may access databases 225 and 230 and search for specified parameters such as specific action types, accounts, or communities. Once the data aggregation has located the data entries in databases 225 and 230 it may sum those entries to find a total value. The data aggregation engine 235 may be used to find the total number of actions recorded by a user, the total action volume of actions assigned to a community, or other aggregated data values. The data aggregation engine 235 also aggregates data for the application in its entirety. This may include aggregating data across users or across communities to find the total impact of the community-based application.

Location engine 240 gathers and records location data of accounts and communities. Location engine 240 may receive user input in the form of an address, city, postal code, or similar to mark the location of a particular user or a community. Location engine 240 may also request location data from the client device 110 in the form of GPS data. Location engine 240 access location data on the client device 110 by requesting access to the device's location services or asking for a user to input a location.

Widget engine 245 creates displays of aggregated data that can be displayed on third party domains 130. The widget engine 245 may receive data from the data aggregation engine 235. The data may include a number or volume of actions recorded by a particular account or assigned to a particular community. The engine 245 may also receive information from the carbon calculator engine 215 including carbon emission equivalents of data from the aggregation engine 235. With this information the widget engine 245 may create embeddable HTML, data packets that can be displayed on third party domains 130. Other methods of creating embeddable code such as using a local or third party API may also be used. Widget engine 245 may enable third party domains such as websites and applications of businesses to display carbon emission equivalents and actions associated with the business's community on the application 112. Businesses and communities may wish to display these widgets on their domain to show their commitment to sustainability.

Incentive and reward engine 250 provides incentives to record user actions. Incentives include challenges and games that present users with a particular goal to meet in a particular location or period of time. For example, a community may create an incentive for its members to record 10 sustainable miles per week for a month. A count of the user's actions is tracked and checked to determine if they align with the goal of incentives the user is enrolled in. In the example, the incentive and reward engine 250 would recognize an action recorded by a user including sustainable miles. The incentive and reward engine 250 checks the total number of sustainable miles completed by the user for the incentive and determines whether the user has completed the challenge. A user who completes the challenge may be provided with a reward such as a virtual badge displayed on their account page or other virtual or physical reward.

Application programming interface (API) 255 provides a platform to interact with third party requests. API 225 may handle third party queries and provide responses to the queries. For example, a widget may be put on a third party website or included in a third party application. The widget may periodically send queries to the API 225 to obtain various data, such as aggregation data, from the server 120. The widget may also establish a data stream with the API 225 to obtain real time updates of aggregation data.

Figure 3:
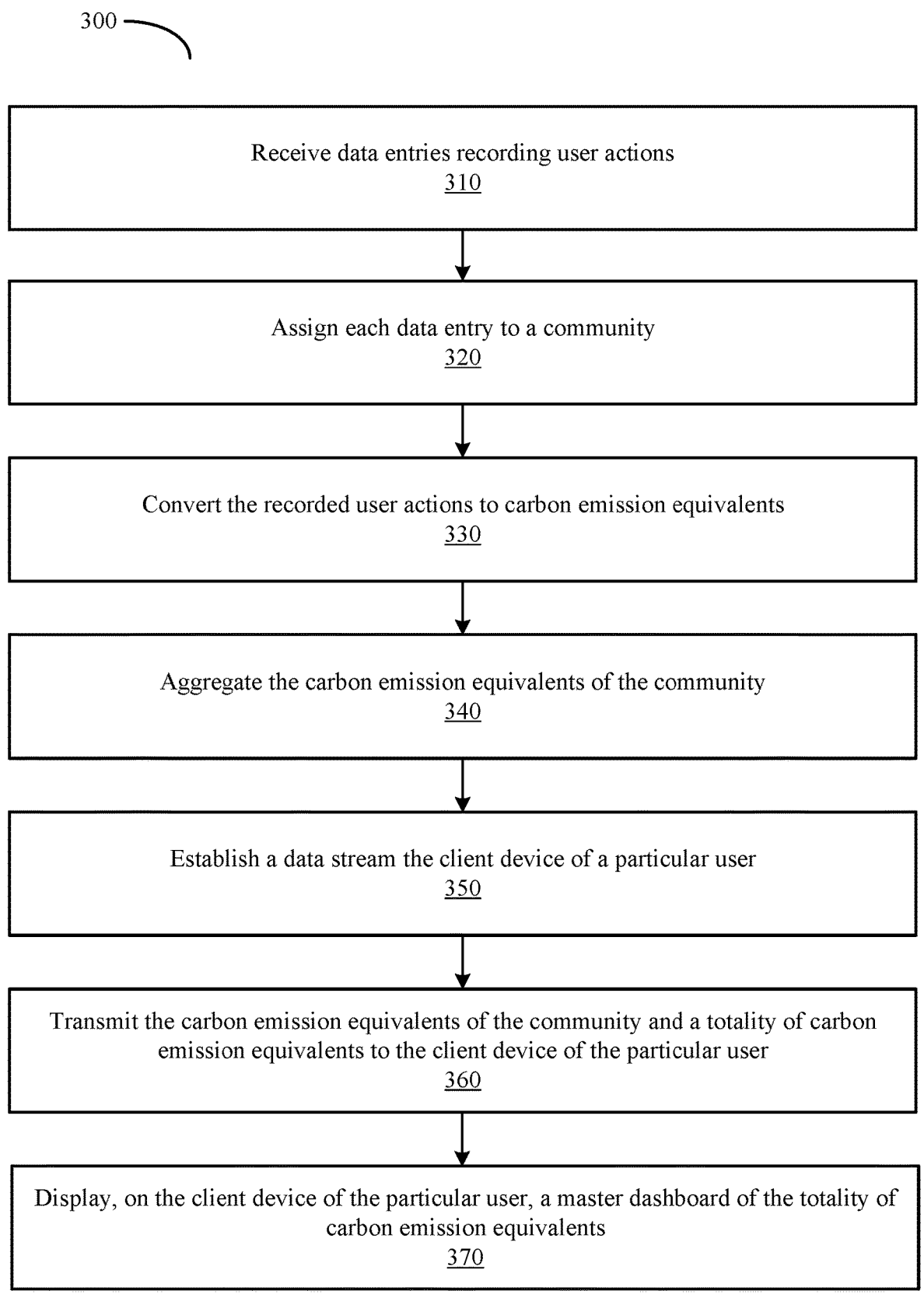
FIG. 3 is a flowchart depicting a computer-implemented process, in accordance with some embodiments.

FIG. 3 is a flowchart depicting a computer-implemented process, in accordance with some embodiments. The flowchart illustrated in FIG. 3 represents specific sets of instructions that may be stored in a computer-readable medium, such as memory. The instructions, when executed by one or more processors, cause the processors to perform the process described. FIG. 3 is merely an example process that may be performed by the computing server 130. The method 300 represents an embodiment of a computer-implemented process to receive user input regarding an action, record that input as well as other separate inputs, aggregate them, and display an aggregated data stream representing the impact of the input user actions. The computer system includes a server 120, networks 140, client devices 110 running an application 112 with a user interface 114, and third party domains 130.

The server 120 receives 310 data entries recording user actions that are input to the application 112 running on a client device 110. Data entries recording user actions may include an action category, action volume, community to assign the action to, user account information, action metadata, location data, and other values. Data entries can be manually entered through an action creation interface displayed on the computing device of a user. Automatic entering of data entries is also possible. For example, users may wear a smartwatch that tracks their commute and uploads their time spent commuting using sustainable transport.

The server 120 assigns 320 each data entry to a community. Using the data entry, the server 120 identifies community data in the entry and finds the community the user requested the action be assigned to. Assigning an action to a community results in the aggregation of the entered action data with other actions previously assigned to the community. In this way users may represent the impact of a group of people working together toward sustainability. Communities may include neighborhoods, schools, clubs, and businesses. Communities may additionally be public or private by restricting access with user access privileges. Sub-communities may also have actions assigned to them in the data entry. In this case, the sub-community receives the action data and that action is aggregated with previous actions assigned to the sub-community. Actions assigned to a sub-community within a community are additionally aggregated to the community such that actions of a sub-community are a subset of those assigned to a community. Each action is assigned to only one community, or only one sub-community of a community to prevent double counting of the impact of the action.

The server 120 then converts 330 the recorded user actions to carbon emission equivalents. Each user action has an associated environmental impact which is measured with a carbon emission equivalent. Carbon emission equivalents represent the amount of carbon in the form of carbon dioxide prevented from being emitted to the atmosphere by performing a sustainable action. The carbon calculator engine 215 converts user actions to carbon emission equivalents by accessing a database of conversion factors associated with each type of action. For example, the carbon calculator engine 215 may receive an action with the category of recycling plastics as well as the volume of plastic recycled. The engine 215 then multiplies the volume of recycled plastic by a value of carbon emission per volume of recycled plastic to find the carbon emission equivalent. More complex conversions may also occur that include time or location dependent equations.

The data aggregation engine 235 of the server 120 aggregates 340 the carbon emission equivalents of the community. Data aggregation may happen before or after the data is converted to carbon emission equivalents and results in the same overall behavior of the system described. Data aggregation entails summing or combining by other functions action data of the same type. For example, a count of actions of a community may be tallied or an overall sum of action volume aggregated. Data may be more specifically aggregated based on a combination of data types, such as the volume of actions with category recycled plastic may be aggregated to find an overall volume of plastic recycled by a community. Data aggregation of user action provides a visual representation to users of the impact of community-based actions compared to the impact of their individual actions.

A data stream is established 350 between the server 120 and client device 110 of a particular user. A data stream may be a transmittance of data stored on one device to a separate device. In this example, the data stream includes the transmittance of carbon emission equivalent data from the server 120 to a client device 110. The data stream may be unidirectional or bi-directional. An example of a bi-directional data stream may include a request from a client device for aggregated action data sent to the server and the server responding by sending the requested data. The data stream enables aggregated data to be stored at one location, the server 120, but accessible by any client device 110 without requiring the client device 110 to store large amounts of aggregated data or conversion calculations.

The carbon emission equivalents of the community and a totality of aggregated carbon emission equivalents are transmitted 360 via the data stream to the client device 110. Responsive to the server 120 receiving a request from a client device 110 for aggregated carbon emission data, the server 120 establishes a data stream with the client device. The request from the client device may include values such as which community's data the user of the client device wants to view or which type of action data the user wishes to view. The user may also request, with their device, to view a totality of carbon emission data associated with the application 112 run by the server 120.

A master dashboard showing the totality of carbon emission equivalents is displayed 370 on the client device 110 of a particular user. The server 120 may send instructions via the data stream for how to display the aggregated data on a specific user interface of the application 112 on client device 110 and activate the user interface for presentation to the user. The master dashboard may include elements the user may interact with through the user interface of the application. For example, a user may be able to toggle units with a switch or change which community's data they are viewing.

Example User Interface

Figure 4:
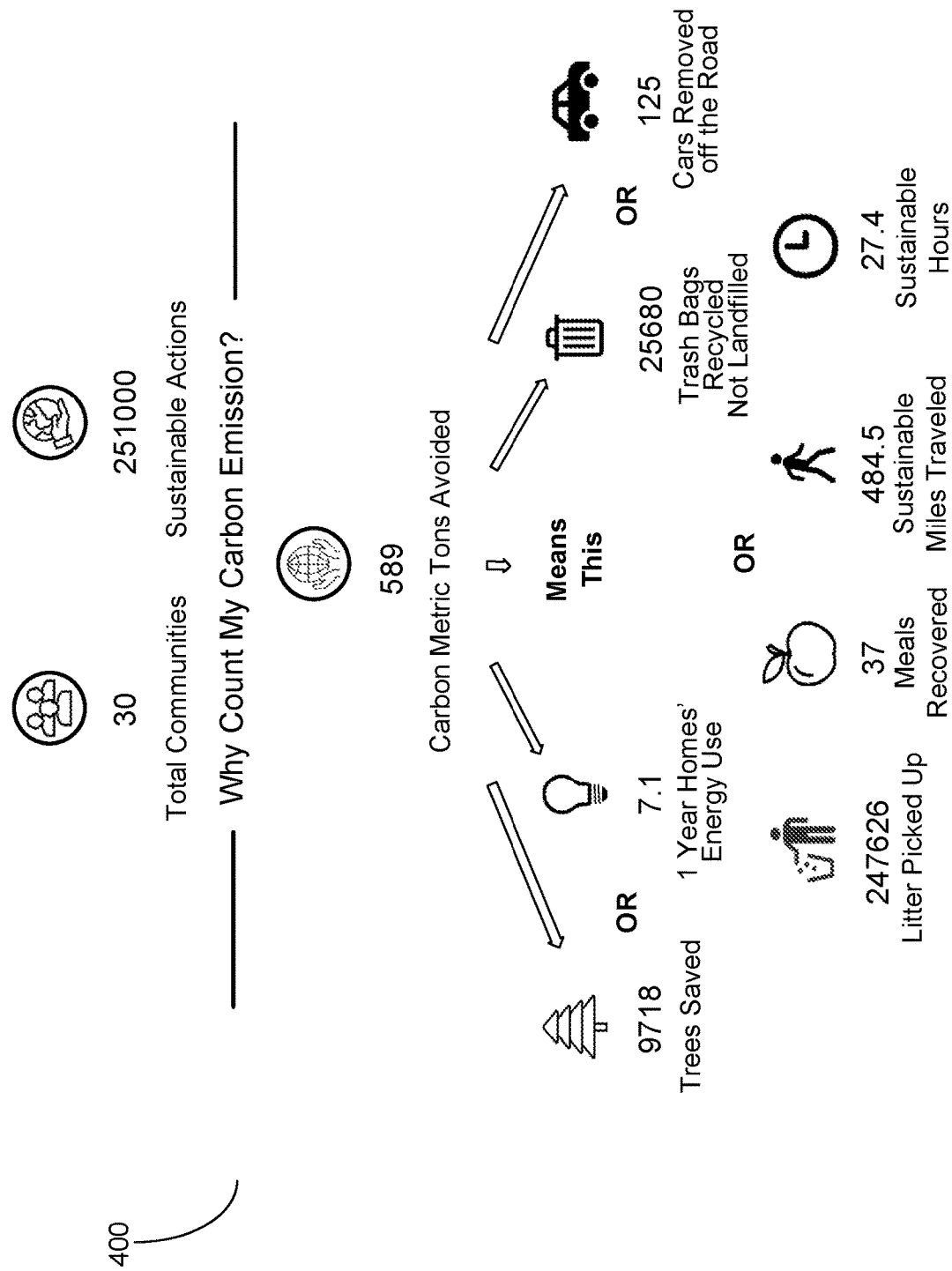
FIG. 4 is a conceptual diagram illustrating an embodiment of the user interface of the master dashboard, in accordance with some embodiments.

FIG. 4 is a conceptual diagram illustrating an embodiment of the user interface of a master dashboard, in accordance with some embodiments. The master dashboard 400 displays aggregated data to a user. The master dashboard 400 displays the aggregated data of a singular user (i.e. the carbon emission equivalents of actions recorded by the user), a singular community (i.e. the carbon emission equivalents of actions users assigned to the community), or the data of every user or every community (i.e. the carbon emission equivalents of actions input to the application). The master dashboard helps a user or a community visualize the impact of their actions with symbolic representations of the carbon emission equivalents. Carbon emission equivalents represent the amount of carbon in the form of carbon dioxide prevented from entering the atmosphere by choosing a sustainable action over an unsustainable action (i.e. biking rather than driving to work). In the master dashboard 400, carbon emission equivalents are represented as actions that prevent an equivalent amount of carbon from entering the atmosphere as the recorded action. For example, in FIG. 4, the total carbon emission equivalent is 589 metric tons which is shown to be equivalent to preventing 9,718 trees from being cut down or recycling 25,680 bags of trash instead of putting them into a landfill. In the embodiment shown in FIG. 4, the master dashboard displays a count of how many communities exist and how many actions have been recorded in the application.

Figure 5:
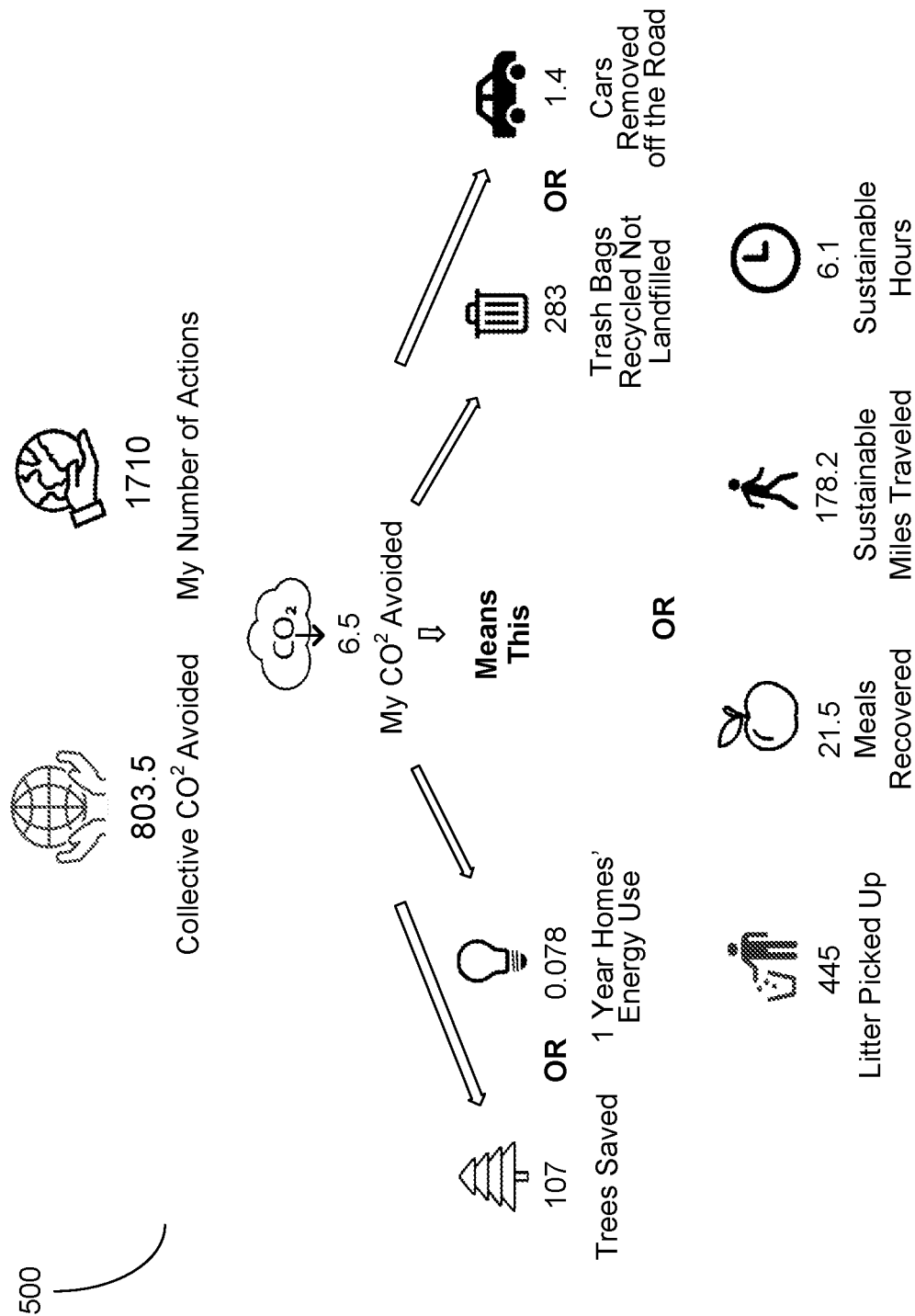
FIG. 5 is a conceptual diagram illustrating an embodiment of the user interface of the master dashboard, in accordance with some embodiments.

FIG. 5 demonstrates a second embodiment of the user interface of the master dashboard. While FIG. 4 demonstrates the master dashboard of multiple communities' data aggregated, FIG. 5 demonstrates the aggregated data of one user. Both of these embodiments are accessible to a user of the application. The application's user interface includes options for a user to choose which set of information to display on the master dashboard such as a button or toggle switch. Master dashboard 500 shows that the particular user whose data is portrayed has performed 1710 actions and prevented 6.5 metric tons of carbon in the form of carbon dioxide from entering the atmosphere which is equivalent to removing 1.4 cars from the road or preventing deforestation of 107 trees. Note that numbers represented in FIGS. 4 and 5 exist as a demonstration of the user interface but may not contain factual values.

The embodiments of the master dashboard in FIGS. 4 and 5 can be converted into a widget for display on third party websites or applications. For example, a business may be a community in which employees assign their sustainable actions. The business can choose to display a widget on their website displaying the master dashboard of data for their community including their carbon emission equivalents. Individual users can similarly embed a widget of their own master dashboard 500 data on their website or social media page.

Figure 6:
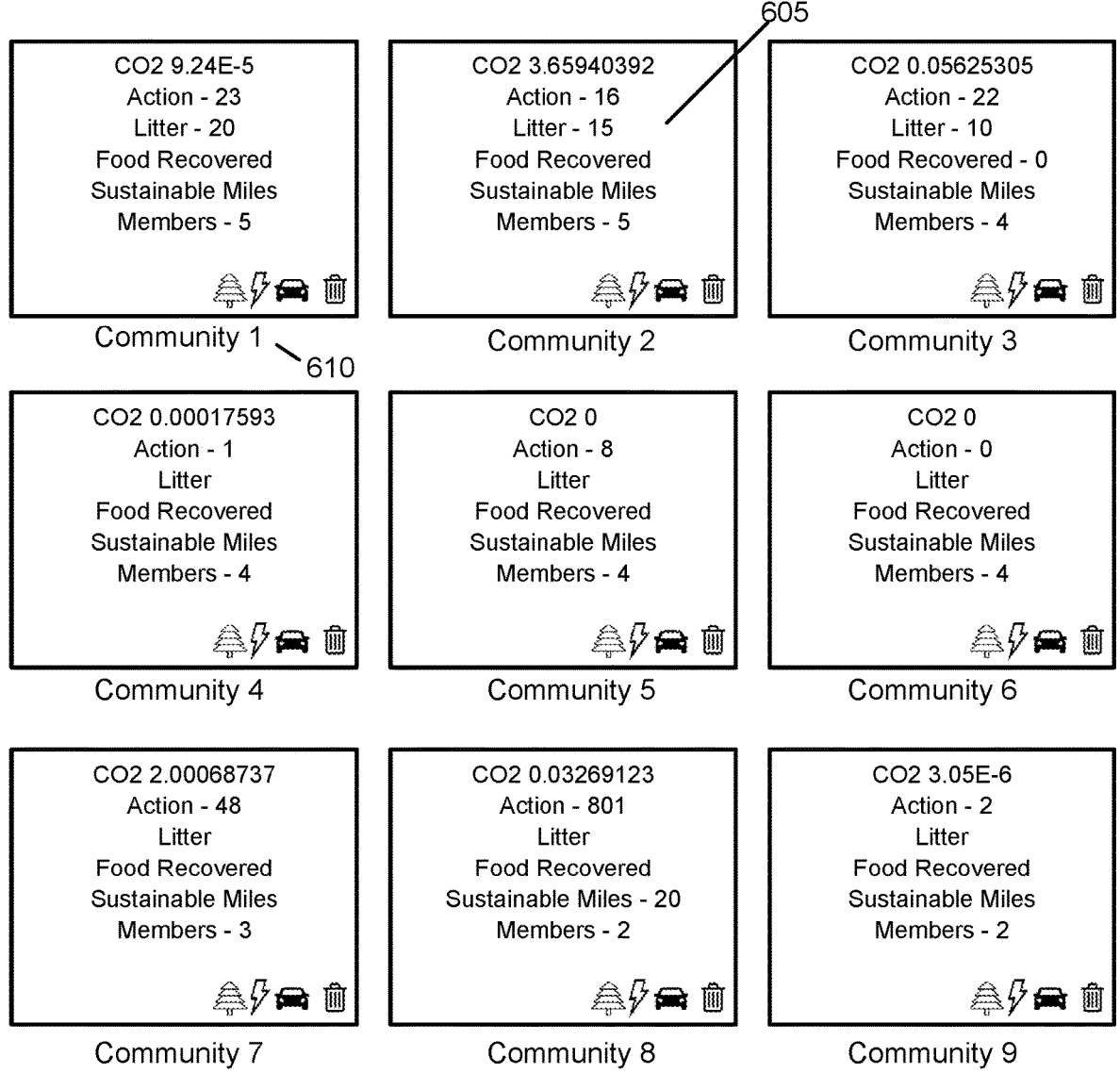
FIG. 6 is a conceptual diagram illustrating an embodiment of a user interface displaying popular communities and their user data, in accordance with some embodiments.

FIG. 6 is a conceptual diagram illustrating an embodiment of a user interface displaying popular communities 600 and their user data, in accordance with some embodiments. A user of the application may see a similar interface if they search for communities to join or go to a popular communities 600 page. Each community is displayed with a community name 610 and community data 605 such as the number of actions recorded by members of the community and the aggregated carbon emission equivalents for the community. On this user interface the user can compare which communities they would like to join. For example, a user may be interested in collecting litter in their neighborhood so they would look for a community focused on collecting litter. In the example shown in FIG. 6, communities 1, 2, and 3 have recorded collecting litter and therefore may be desirable for the user to join. Communities may have access privileges to restrict who may and may not join the community. Communities with access privileges (i.e. restricted access) are referred to as private while communities without access privileges (i.e. unrestricted access) are referred to as public. Access privileges may be chosen while creating a community. Access privileges may be based on user location (i.e. only residents of a particular neighborhood), user age, user email address (i.e. only users with ".edu" emails may join a community for college students), and other parameters. The community may also restrict access to only users who request access. The community may then dedicate a user as an administrator who determines whether or not to admit requesting users. This form of restricted access may be used, for example, by a classroom of a school. The teacher of the classroom may choose to admit users based on whether or not they are students of the class.

Figure 7A:
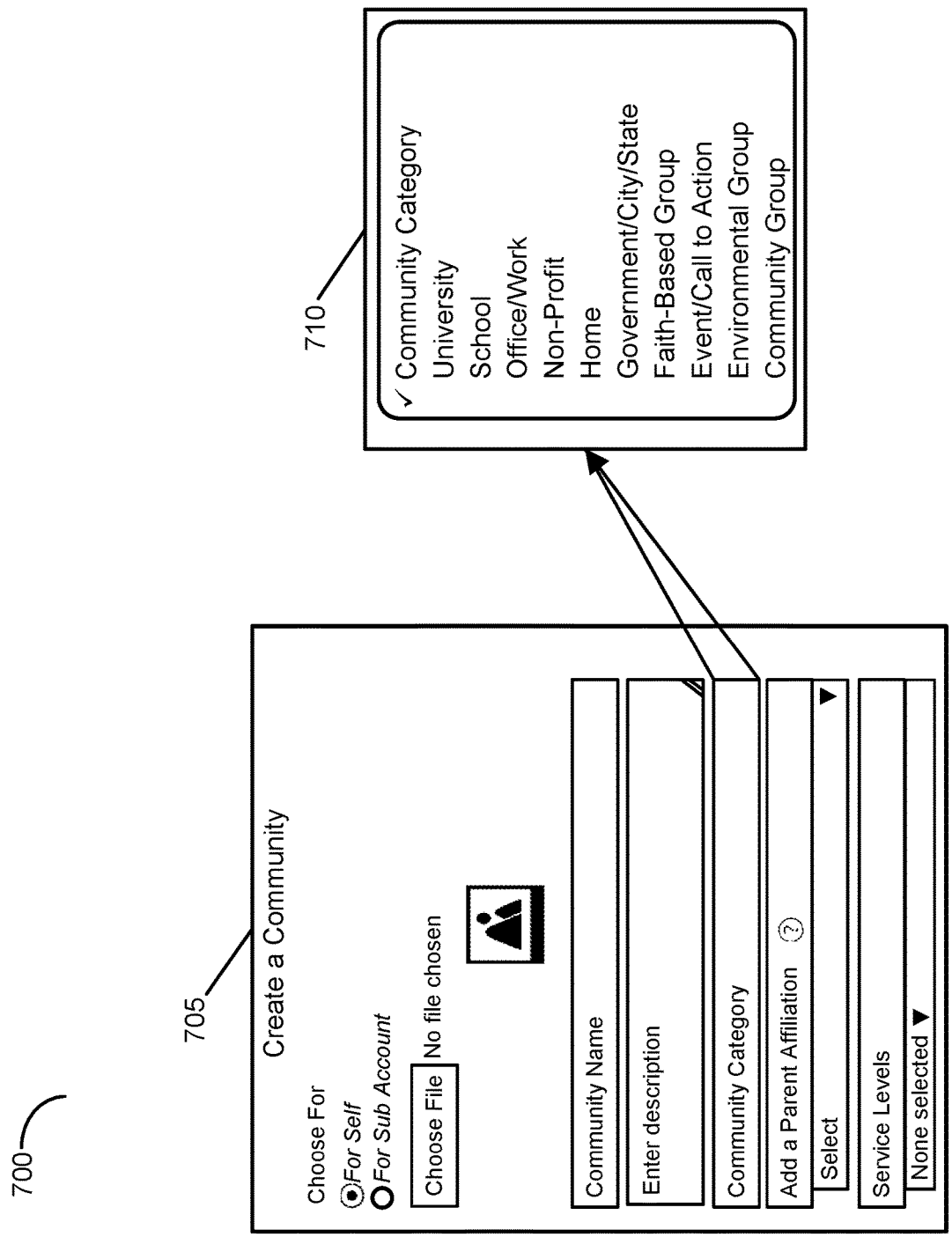
FIGS. 7A, 7B, and 7C are conceptual diagrams illustrating an embodiment of a user interface for creating a community and setting its parameters, in accordance with some embodiments.
Figure 7B:
Figure 7C:
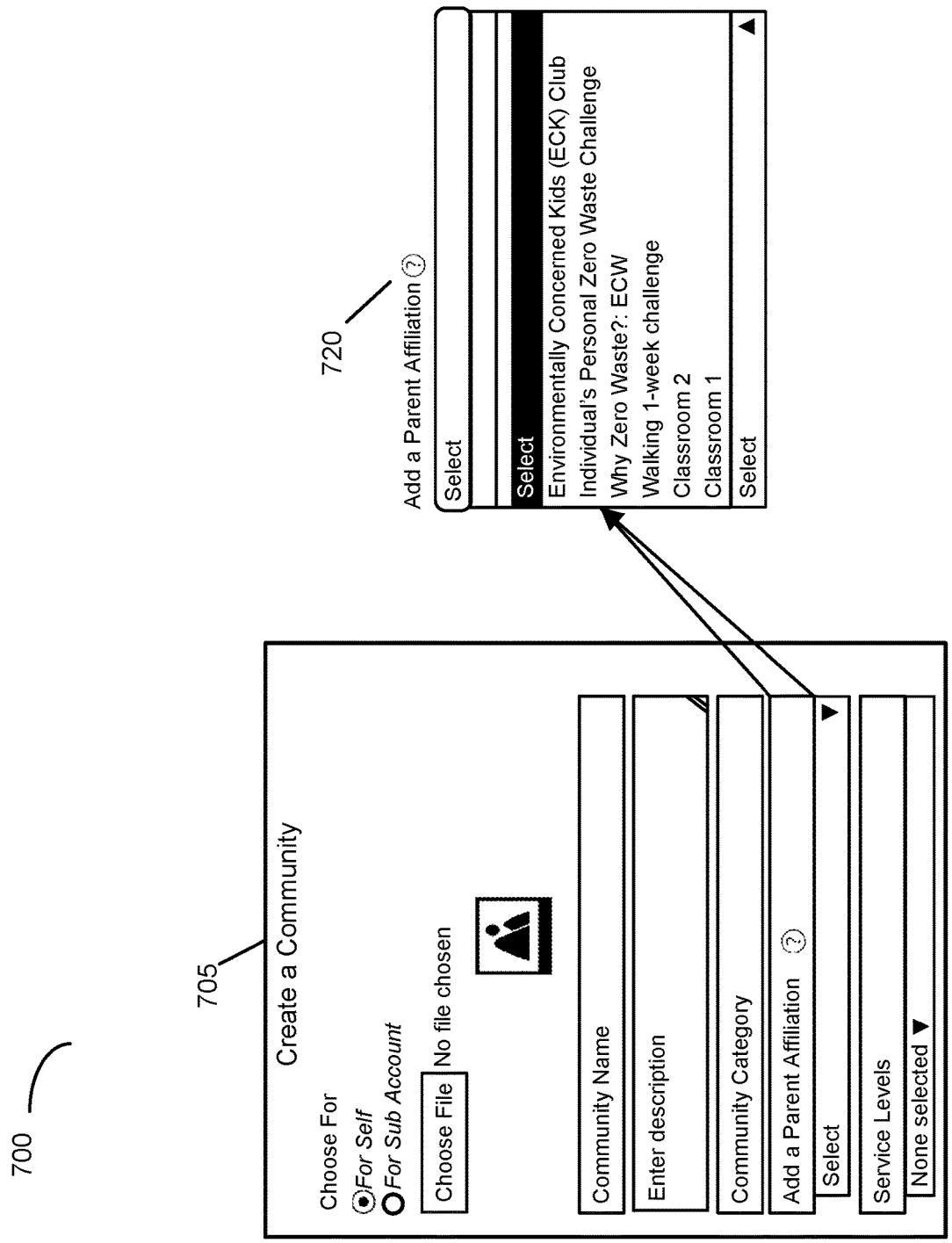

FIGS. 7A, 7B, and 7C are conceptual diagrams illustrating an embodiment of a user interface for creating a community and setting its parameters, in accordance with some embodiments. FIG. 7A shows method 700 for creating a community and choosing the characteristics of the community. Community creation interface 705 allows the user to create a new community in the application. Interface 705, as shown in the embodiment of FIG. 7A has fields for adding a community name, description, category, parent affiliation, and service level. Other embodiments of the community creation interface 705 may include different or additional fields for customization of the community. The community name provides a way for users to find and refer to the community while the community description may describe the goals and values of the community. The community category, chosen by selecting an option from community category drop down 710, provides an indication of the community's affiliation with a particular type of group such as a school, business, church, or other group.

The community creation interface 705 of FIG. 7A also has fields for choosing whether the community is being created by the user (self) or for another user of the account (sub-account). In this way, for example, a parent could create a community for their child and other children in their neighborhood by choosing "sub-account" and selecting the sub-account of their child that is affiliated with the parent's account. A user can also select an image to represent the community and upload that image in a variety of formats including PNG, JPEG, and others.

FIG. 7B demonstrates the same community creation interface 705 as FIG. 7A but highlights an embodiment of the service level menu 715. Service levels allow a community to note what services they have or perform. For example, a neighborhood community may select the service levels of materials that their neighborhood has picked up curbside weekly including glass recycling, plastic recycling, yard trimmings, or other materials. The service level menu 715 allows users of the community to see what waste management services are offered so that they may take advantage of them and properly sort their waste for recycling in their community. The service level menu 715 may also include fields to select the frequency of waste pick up, location of pick up, maximum volume of pick up, and more.

FIG. 7C demonstrates the same community creation interface 705 as FIG. 7A but highlights the parent affiliation menu 720. The parent affiliation menu 720 allows a user creating a community to choose a larger cause that the actions of the community are dedicated to which may be another community. For example, National Club ABC may have a community on the application that includes all club members. National Club ABC may choose to create sub-communities within their community for each regional chapter of the club. This sub-division of communities allows actions assigned to the sub-community to be aggregated with the data of the overall community. In this example, if National Club ABC had 4 regional chapters each with their own sub-community, the actions attributed to those 4 sub-communities would be shown on the master dashboard of the main, national community. Parent affiliations may also be challenges or other types of categories that a community may align with.

When a user searches for a community to join, any of the characteristics of the community may be used to filter the results. For example, a user may choose to only search for communities in the "University" category that have the parent affiliation of the user's particular university. Another user may search communities by their service levels to see where they can recycle waste materials they have such as yard trimmings and mixed plastics.

FIG. 8 is a conceptual diagram illustrating an embodiment of a user interface for recording a user action and selecting action parameters, in accordance with some embodiments. FIG. 8 shows a method of recording a user action 800. The method 800 involves entering action parameters to action creation interface 805. The action creation interface 805 presents the user with parameters such as who the action was performed by (self or sub-account), whether the action should be assigned to a community or a public place, what kind of impact the action has, and the action type. The kind of image an action has may be illustrated with a legend of symbols, colors, or patterns for each type of impact. For example, actions that are associated with sustainable miles, such as walking to work, may be shown with a specific impact symbol for sustainable miles. Action selection menu 810 allows a user to choose the type of action they are recording. For example, the user may select "refusing meat, dairy, and eggs" from the action selection menu 810 if they have eaten vegetarian meals for a day and thus prevented an amount of carbon dioxide from entering the atmosphere from livestock farming. Other parameters may be included in the action creation interface 805 such as sub-categories for action types and measures of action volume such as an amount of time or weight of waste. The action creation interface 805 may also include a field for entering action verification information such as an image of the user performing the recorded action. Other action parameters may additionally be included.

Figure 9:
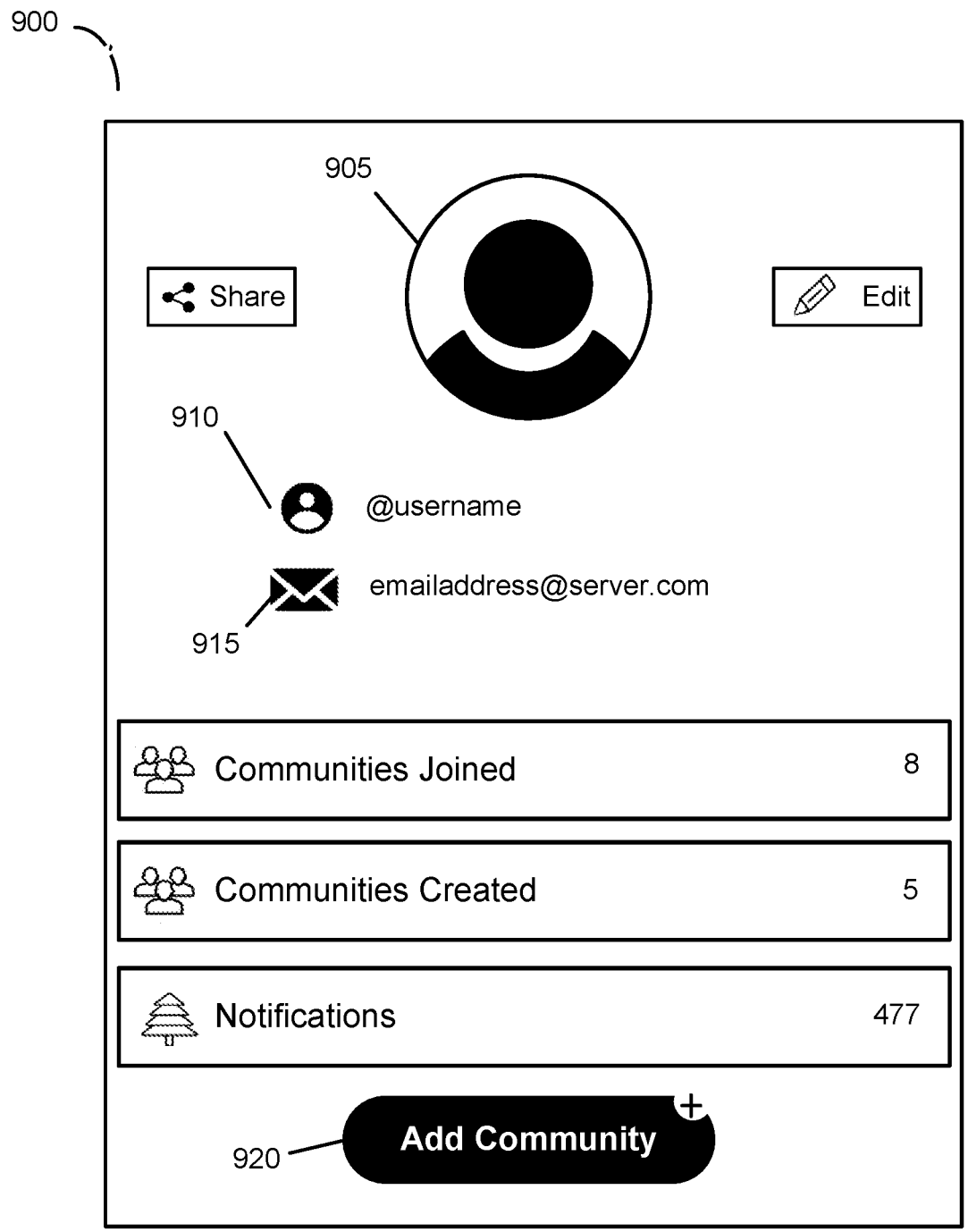
FIG. 9 is a conceptual diagram illustrating an embodiment of a user interface of a user account page, in accordance with some embodiments.

FIG. 9 is a conceptual diagram illustrating an embodiment of a user interface of a user account page, in accordance with some embodiments. The user account page 900 shows characteristics of the account associated with a user. The user may set a profile image 905 by selecting and uploading an image file to their profile. The profile image 905 is then associated with the account and used as a thumbnail symbol to denote the user's profile. The user profile 900 may also display the user's username 910 and email address 915 for the purpose of contacting the account holder. The application may contain settings in some embodiments to enable user privacy by hiding the username and/or email address from other users. The user account page 900 may additionally have an add community button 920 to reach the interface shown in FIGS. 7A, 7B, and 7C for creating a community. Other values may be shown on the user account page 900 as a representation of the user's activities. These values may include a number of actions recorded, communities joined, communities created, and notifications for the user, as well as other possible values.

Example Computing Machine

FIG. 10 is a block diagram illustrating an example architecture of a computing device, in accordance with some embodiments. The computing device (or computer) is capable of reading instructions from a computer-readable medium and executing them in a processor (or controller). A computer described herein may include a single computing machine shown in FIG. 10, a virtual machine, a distributed computing system that includes multiple nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIG. 1, including but not limited to, the user device 110, the computing server 120, and various engines, modules, interfaces, terminals, computing nodes and machines in FIG. 2. While FIG. 10 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1000 may also include a memory 1004 that stores computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes. The processors 1002 may include one or more multiply-accumulate units (MAC units) that are used to perform computations of one or more processes described herein.

One and more methods described herein improve the operation speed of the processors 1002 and reduces the space required for the memory 1004. For example, the various processes described herein reduce the complexity of the computation of the processors 1002 by applying one or more novel techniques that simplify the steps in analyzing data and generating results of the processors 1002. The algorithms described herein also reduces the size of the models and datasets to reduce the storage space requirement for memory 1004.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer to some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a graphical user interface (GUI) to display one or more results and data generated by the processes described herein. The computer system 1000 may also include alphanumeric input device 1012 (e.g., a keyboard), a cursor control device 1014 (e.g., a mouse, a trackball, a joystick, a motion sensor, or other pointing instrument), a storage unit 1016 (a hard drive, a solid state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

In various embodiments, a non-transitory computer readable medium that is configured to store instructions may be used. The instructions, when executed by one or more processors, cause the one or more processors to perform steps described in the above computer-implemented processes or described in any embodiments of this disclosure. In various embodiments, a system may include one or more processors and a storage medium that is configured to store instructions. The instructions, when executed by one or more processors, cause the one or more processors to perform steps described in the above computer-implemented processes or described in any embodiments of this disclosure.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not always imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
   providing a plurality of carbon-footprint-tracking applications operated at a plurality of client devices to a plurality of users, wherein a first carbon-footprint-tracking application is provided to a first user and a second carbon-footprint-tracking application is provided to a second user, wherein the first carbon-footprint-tracking application operates in a first wearable client device and is configured to track user actions of the first user automatically in real-time, and wherein the second carbon-footprint-tracking application is configured to receive manual inputs from the second user who records user actions through a second client device;
   receiving selections of communities from the first user and the second user, wherein the first user and the second user select a first community that is associated with a goal;
   receiving geolocation data associated with the first wearable client device and the second client device;
   identifying community events based on the geolocation data associated with the first wearable client device and the second client device, wherein the community events are identified as in line with the goal associated with the first community;
   receiving, by a computing server remote from the plurality of carbon-footprint-tracking applications, data entries recording user actions, wherein the data entries comprises a first data entry of the first user that is generated by tracking the user action of the first user in a first community event automatically in real-time and a second data entry that is manually recorded by the second user in a second community event, wherein the first community event and the second community event are identified based on the geolocation data associated with the first wearable client device and the second client device and are identified as in line with the goal associated with the first community;
   verifying the second data entry that is manually recorded by the second user through a verification proof that is captured by the second client device;
   assigning a plurality of data entries recording user actions to the first community, wherein the plurality of data entries assigned to the first community comprises the first data entry that is generated by tracking the user action of the first user automatically in real-time and the second data entry that is verified;
   converting the user actions recorded in the data entries to carbon emission equivalents, wherein the carbon emission equivalents are computed using data values corresponding to the user actions, and at least one of the data values is recorded automatically by the first wearable client device;
   aggregating the carbon emission equivalents of the first community, wherein aggregated carbon emission equivalents of the first community comprise data converted from one or more automatically tracked user actions of a plurality of users belonging to the first community;
   aggregating the carbon emission equivalents of a second community different from the first community;
   providing an embeddable widget code to a third-party website and to a social media page of the first user, the embeddable widget code allowing the third-party website to incorporate a first widget that is in communication with the computing server and allowing the user to incorporate a second widget to the social media page of the first user, the embeddable widget code comprising instructions that periodically sends API queries to the computing server, wherein the first widget and the second widget are different from the first carbon-footprint-tracking application and different from the second carbon-footprint-tracking application;
   establishing a first data stream between the first widget and the computing server and a second data stream between the second widget and the computing server; and
   transmitting, via the first data stream, the carbon emission equivalents of the first community and the carbon emission equivalents of the second community, wherein stream the first data stream and the second data stream comprising real-time converted carbon emission equivalent data that is converted from user actions tracked automatically in real-time, wherein the first widget is configured to update the carbon emission equivalents of the first community and the second community in real time through the API queries, wherein the embeddable widget code allows the first user to share the second widget that tracks the carbon emission equivalents of the first community with other users on the social media page.

2. The computer-implemented method of claim 1, further comprising storing user accounts corresponding to a plurality of users, at least one of the user accounts of a primary user includes a plurality of sub-accounts that are assigned to secondary users, wherein the data entries of the user actions associated with the sub-accounts are aggregated towards the carbon emission equivalents of the primary user.

3. The computer-implemented method of claim 1, wherein the first community is associated with user access privileges, the first community being a primary community that includes a plurality of sub-communities, wherein data entries of user actions assigned to the sub-community are aggregated toward the carbon emission equivalents of the primary community.

4. The computer-implemented method of claim 1, wherein the first widget is an embeddable widget, the embeddable widget displayable on a plurality of external websites and applications.

5. The computer-implemented method of claim 1 further comprising:
   receiving one or more candidate sponsored content items, each sponsored content item associated with a first set of one or more metadata tags;

receiving, from a third client device, an application lifecycle notification, the application lifecycle notification comprising a second set of one or more metadata tags;

comparing the first and second sets of metadata tags; and selecting, based on comparing the first and second sets of metadata tags, a sponsored content item from the one or more candidate sponsored content items for display at the third client device.

6. The computer-implemented method of claim 1 further comprising:

displaying, to a third user, suggested content within a threshold distance of a geographic location of a third user.

7. The computer-implemented method of claim 1 further comprising:

hosting incentivizing challenges that encourage users to input user actions with challenges, games, badges, and/or rewards, the incentivizing challenges further comprising:

storing a count of a user's actions, a user's carbon emission equivalent, or a community's carbon emission equivalent;

comparing the count to a goal; and responsive to the count becoming greater than or equal to the goal, displaying a badge associated with a user's or community's completion of the incentivizing challenge.

8. The computer-implemented method of claim 1 further comprising:

verifying a user action with additional data received with the data entries recording user actions, the additional data comprising an image or video of the user action, verification statement, or signature.

9. The computer-implemented method of claim 1 wherein one or more communities are associated with one or more access privilege levels that enable the communities to be public or private.

10. A non-transitory computer readable medium for storing computer code comprising instructions, when executed by one or more processors, cause the one or more processors to perform steps comprising:

providing a plurality of carbon-footprint-tracking applications operated at a plurality of client devices to a plurality of users, wherein a first carbon-footprint-tracking application is provided to a first user and a second carbon-footprint-tracking application is provided to a second user, wherein the first carbon-footprint-tracking application operates in a first wearable client device and is configured to track user actions of the first user automatically in real-time, and wherein the second carbon-footprint-tracking application is configured to receive manual inputs from the second user who records user actions through a second client device;

receiving selections of communities from the first user and the second user, wherein the first user and the second user select a first community that is associated with a goal;

receiving geolocation data associated with the first wearable client device and the second client device;

identifying community events based on the geolocation data associated with the first wearable client device and the second client device, wherein the community events are identified as in line with the goal associated with the first community;

receiving, by a computing server remote from the plurality of carbon-footprint-tracking applications, data entries recording user actions, wherein the data entries comprises a first data entry of the first user that is generated by tracking the user action of the first user in a first community event automatically in real-time and a second data entry that is manually recorded by the second user in a second community event, wherein the first community event and the second community event are identified based on the geolocation data associated with the first wearable client device and the second client device and are identified as in line with the goal associated with the first community;

verifying the second data entry that is manually recorded by the second user through a verification proof that is captured by the second client device;

assigning a plurality of data entries recording user actions to the first community, wherein the plurality of data entries assigned to the first community comprises the first data entry that is generated by tracking the user action of the first user automatically in real-time and the second data entry that is verified;

converting the user actions recorded in the data entries to carbon emission equivalents, wherein the carbon emission equivalents are computed using data values corresponding to the user actions, and at least one of the data values is recorded automatically by the first wearable client device;

aggregating the carbon emission equivalents of the first community, wherein aggregated carbon emission equivalents of the first community comprise data converted from one or more automatically tracked user actions of a plurality of users belonging to the first community;

aggregating the carbon emission equivalents of a second community different from the first community;

providing an embeddable widget code to a third-party website and to a social media page of the first user, the embeddable widget code allowing the third-party website to incorporate a first widget that is in communication with the computing server and allowing the user to incorporate a second widget to the social media page of the first user, the embeddable widget code comprising instructions that periodically sends API queries to the computing server, wherein the first widget and the second widget are different from the first carbon-footprint-tracking application and different from the second carbon-footprint-tracking application;

establishing a first data stream between the first widget and the computing server and a second data stream between the second widget and the computing server; and transmitting, via the first data stream, the carbon emission equivalents of the first community and the carbon emission equivalents of the second community, wherein the first data stream and the second data stream comprising real-time converted carbon emission equivalent data that is converted from user actions tracked automatically in real-time, wherein the first widget is configured to update the carbon emission equivalents of the first community and the second community in real time through the API queries, wherein the embeddable widget code allows the first user to share the second widget that tracks the carbon emission equivalents of the first community with other users on the social media page.

11. The non-transitory computer readable medium of claim 10, wherein the steps further comprise storing user accounts corresponding to a plurality of users, at least one of the user accounts of a primary user includes a plurality of sub-accounts that are assigned to secondary users, wherein the data entries of the user actions.

12. The non-transitory computer readable medium of claim 10, wherein the first community is associated with user access privileges, the first community being a primary community that includes a plurality of sub-communities, wherein data entries of user actions assigned to the sub-community are aggregated toward the carbon emission equivalents of the primary community.

13. The non-transitory computer readable medium of claim 10, wherein the first widget is an embeddable widget, the embeddable widget displayable on a plurality of external websites and applications.

14. The non-transitory computer readable medium of claim 10, wherein the steps further comprise:
   receiving one or more candidate sponsored content items, each sponsored content item associated with a first set of one or more metadata tags;
   receiving, from a third client device, an application lifecycle notification, the application lifecycle notification comprising a second set of one or more metadata tags;
   comparing the first and second sets of metadata tags; and
   selecting, based on comparing the first and second sets of metadata tags, a sponsored content item from the one or more candidate sponsored content items for display at the third client device.

15. The non-transitory computer readable medium of claim 10, wherein the steps further comprise:
   displaying, to a third user, suggested content within a threshold distance of a geographic location of a third user.

16. The non-transitory computer readable medium of claim 10, wherein the steps further comprise:
   hosting incentivizing challenges that encourage users to input user actions with challenges, games, badges, and rewards, the incentivizing challenges further comprising:
      storing a count of a user's actions, a user's carbon emission equivalent, or a community's carbon emission equivalent;
      comparing the count to a goal; and
      responsive to the count becoming greater than or equal to the goal, displaying a badge associated with a user's or community's completion of the incentivizing challenge.

17. The non-transitory computer readable medium of claim 10, wherein the steps further comprise:
   verifying a user action with additional data received with the data entries recording user actions, the additional data comprising an image or video of the user action, verification statement, or signature.

18. The non-transitory computer readable medium of claim 10, wherein one or more communities are associated with one or more access privilege levels that enable the communities to be public or private.

19. A system comprising:
   one or more processors;
   memory configured to store computer code comprising instructions, when executed by the one or more processors, cause the one or more processors to perform steps comprising:
      providing a plurality of carbon-footprint-tracking applications operated at a plurality of client devices to a plurality of users, wherein a first carbon-footprint-tracking application is provided to a first user and a second carbon-footprint-tracking application is provided to a second user, wherein the first carbon-footprint-tracking application operates in a first wearable client device and is configured to track user actions of the first user automatically in real-time, and wherein the second carbon-footprint-tracking application is configured to receive manual inputs from the second user who records user actions through a second client device;
      receiving selections of communities from the first user and the second user, wherein the first user and the second user select a first community that is associated with a goal;
      receiving geolocation data associated with the first wearable client device and the second client device;
      identifying community events based on the geolocation data associated with the first wearable client device and the second client device, wherein the community events are identified as in line with the goal associated with the first community;
      receiving, by a computing server remote from the plurality of carbon-footprint-tracking applications, data entries recording user actions, wherein the data entries comprises a first data entry of the first user that is generated by tracking the user action of the first user in a first community event automatically in real-time and a second data entry that is manually recorded by the second user in a second community event, wherein the first community event and the second community event are identified based on the geolocation data associated with the first wearable client device and the second client device and are identified as in line with the goal associated with the first community;
      verifying the second data entry that is manually recorded by the second user through a verification proof that is captured by the second client device;
      assigning a plurality of data entries recording user actions to the first community, wherein the plurality of data entries assigned to the first community comprises the first data entry that is generated by tracking the user action of the first user automatically in real-time and the second data entry that is verified
      converting the user actions recorded in the data entries to carbon emission equivalents, wherein the carbon emission equivalents are computed using data values corresponding to the user actions, and at least one of the data values is recorded automatically by the first wearable client device;
      aggregating the carbon emission equivalents of the first community, wherein aggregated carbon emission equivalents of the first community comprise data converted from one or more automatically tracked user actions of a plurality of users belonging to the first community;
      aggregating the carbon emission equivalents of a second community different from the first community;
      providing an embeddable widget code to a third-party website and to a social media page of the first user, the embeddable widget code allowing the third-party website to incorporate a first widget that is in communication with the computing server and allowing the user to incorporate a second widget to the social media page of the first user, the embeddable widget code comprising instructions that periodically sends API queries to the computing server, wherein the first widget and the second widget are different from the first carbon-footprint-tracking application and different from the second carbon-footprint-tracking application;

establishing a first data stream between the first widget and the computing server and a second data stream between the second widget and the computing server; and transmitting, via the first data stream, the carbon emission equivalents of the first community and the carbon emission equivalents of the second community, wherein the first data stream and the second data stream comprising real-time converted carbon emission equivalent data that is converted from user actions tracked automatically in real-time, wherein the first widget is configured to update the carbon emission equivalents of the first community and the second community in real time through the API queries, wherein the embeddable widget code allows the first user to share the second widget that tracks the carbon emission equivalents of the first community with other users on the social media page.

* * * * *